A. BLOOM.
HAND THRESHING MACHINE.

No. 6,679. Patented Aug. 28, 1849.

UNITED STATES PATENT OFFICE.

ABRAM BLOOM, OF NEWVILLE, PENNSYLVANIA.

THRESHING-MACHINE.

Specification of Letters Patent No. 6,679, dated August 28, 1849.

*To all whom it may concern:*

Be it known that I, ABRAM BLOOM, of Newville, in the county of Cumberland and State of Pennsylvania, have invented a new and useful Improvement in Machines for Threshing Grain, Particularly Applicable to Those Moved by Hand; and I do hereby declare that the following is a full, clear, and exact description of the same, reference being had to the accompanying drawings, which form part of this specification, in which—

Figure 1:
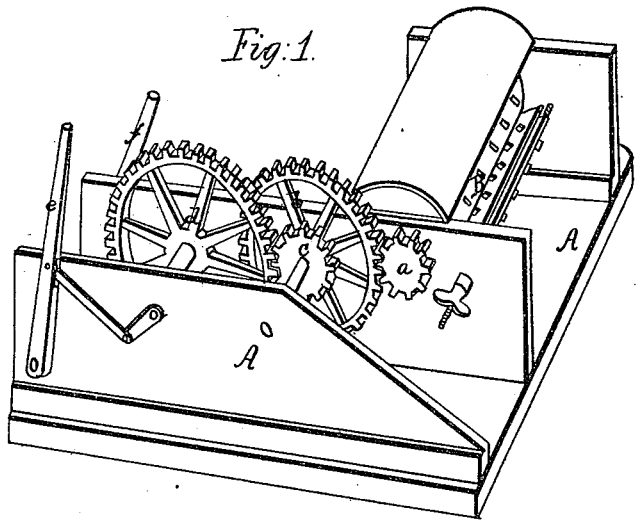
Figure 3:
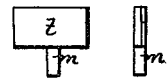
Figure 2:
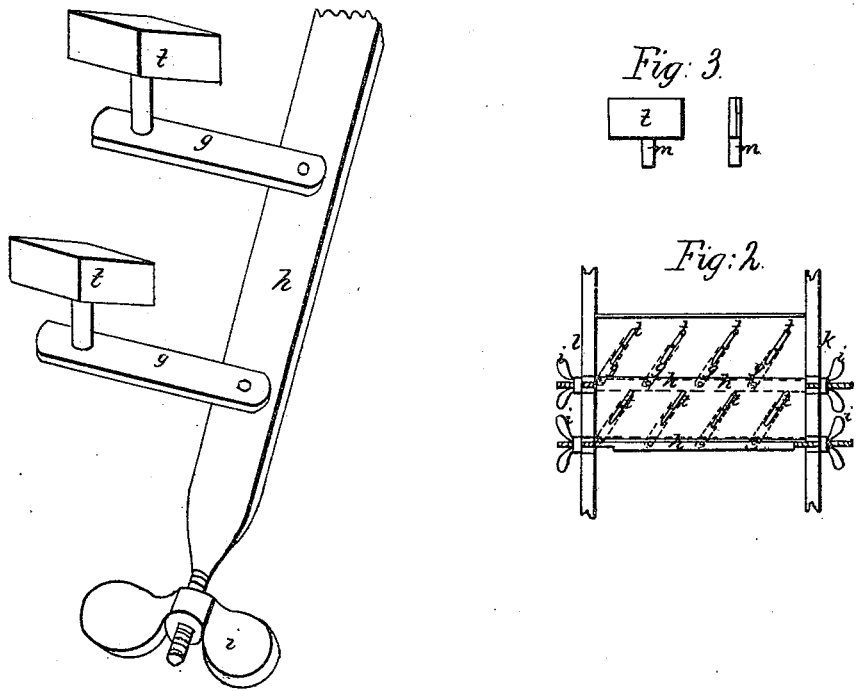

Figure 1 is a perspective view of a hand threshing machine; Fig. 2, a view of the concave, and Fig. 3 views of the side and edge of a single tooth of the concave.

The nature of my invention consists in the application of adjustable teeth to the concave by which the dimensions of the spaces through which the straw passes are regulated according to the nature of the material to be operated upon.

In the accompanying drawing A is the frame of a hand threshing machine; B, the cylinder to which teeth are attached, this cylinder is put in motion by the train of wheels *a b c d*, the last of these being turned by two cranks affixed to the extremities of its shaft; the cranks are connected with the levers *e f* to which the hands of the operator are applied.

In the ordinary construction of threshing machines, the teeth upon the concave are firmly fixed to it, whence it happens that if the machine be so constructed that the teeth of the cylinder revolve sufficiently close to the teeth of the concave to thresh small grain or grain with a fine straw, and it be required to thrash a coarse strawed grain by the same machine, a great amount of power is wasted in drawing the masses of coarse straw through the small spaces; while if a machine be constructed with the spaces sufficiently large to admit coarse straw advantageously, then the threshing of a fine strawed grain is not thoroughly performed. To obviate this difficulty I attach the teeth *t* (Fig. 3) to the concave by a pivot *m* on which they may be turned, instead of attaching them rigidly as in the usual construction. To the portions of these pivots which project beneath the concave I attach the bars *g g* (red lined in Fig. 2) the opposite ends of these bars are hinged to the bars *h* there being as many bars *h* as there are rows of teeth on the concave. The extremities of the rods *h h* are passed through the sides *k l* of the thresher frame, and are cut into screws, to these screws nuts *i i* are adapted by which the bars can be secured in any required position. If coarse strawed grain is to be threshed the bars *h h* are moved from *l* toward *k* whereby the teeth of the concave through the medium of the levers *g* are turned more nearly at right angles to the cylinder leaving wider spaces between the teeth for the straw to pass through, and thus diminishing the power required to turn the cylinder.

If on the other hand it be required to thresh a fine strawed or small grain, then the bars *h h* are moved from *k* toward *l* whereby the teeth are turned obliquely across the concave, and the open space between *k* and *l* is consequently diminished as much as may be required to effect a thorough separation of the grain from the straw. This nicety of adjustment of the capacity of the channels to the size of the grain and straw is especially important in a machine operated by hand, because with ordinary care upon the part of the operator, a great amount of labor may thereby be saved, and a thorough performance of the work at all times secured.

What I claim as my invention and desire to secure by Letters Patent is—

The employment of adjustable teeth *t* turning upon pivots *m* on the concave of threshing machines substantially in the manner and for the purpose herein described.

In testimony whereof I have hereunto signed my name in presence of two witnesses.

ABRAM X BLOOM.
his mark

Witnesses:
E. VONCE,
P. H. WATSON.